Patented July 6, 1943

2,323,314

UNITED STATES PATENT OFFICE 2,323,314

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application November 9, 1940, Serial No. 365,108

7 Claims. (Cl. 260—199)

This invention relates to new azo dye compounds and their application to the art of coloring.

We have discovered that the azo compounds selected from the group consisting of azo compounds having the general formulae:

$$R-N=N-R_1 \text{ and } R-N=N-R_2$$

wherein R represents the residue of a member selected from the group consisting of an aryl nucleus of the benzene series, an aryl nucleus of the naphthalene series, a benzoxazole nucleus and a benzothiazole nucleus, $R_1$ represents the residue of a benzene nucleus, $R_2$ represents the residue of a naphthalene nucleus and wherein the nuclei $R_1$ and $R_2$ each contains a

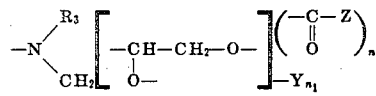

grouping, wherein Z represents a member selected from the group consisting of hydrogen, an alkyl, a cycloalkyl, and alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

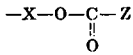

group, wherein X stands for an alkyl hydrocarbon radical, $n$ stands for 1 or 2 and $n_1$ stands for 0 or 1, in para position to the azo bond, constitute a valuable class of dye compounds. Depending upon their structure, the azo compounds of our invention possess application for the coloration of organic derivatives of cellulose, silk and wool, particularly textile materials in the form of yarn, thread or fabric, for example, made of these materials. Coloration can be effected by dyeing, printing, stenciling or like methods.

While our invention relates broadly to the azo compounds having the formulae given above, it relates more particularly to those compounds wherein R is a benzene nucleus, $R_3$ is hydrogen, alkyl or furyl, Y is hydrogen or alkyl and Z is alkyl or furyl.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivatives of cellulose that our invention is particularly directed. The nuclear non-sulfonated compounds likewise possess some application for the dyeing of wool and silk. For the dyeing of organic derivatives of cellulose, such as cellulose acetate silk, nuclear non-sulfonated dye compounds wherein R is a benzene nucleus are generally advantageous.

The nuclear sulfonated compounds of our invention have little or no utility for the dyeing of organic derivatives of cellulose but possess application for the dyeing of wool and silk. Preferably when the dye compounds of our invention are to be employed for the dyeing of organic derivatives of cellulose, they should contain no nuclear free carboxylic acid group. Red, yellow, orange-yellow, orange-red, greenish-blue, blue, and violet dyeings, for example, can be obtained employing the dye compounds of our invention.

It is an object of our invention to provide a new class of azo dye compounds suitable for the coloration of organic derivatives of cellulose, wool and silk. Another object of our invention is to provide a process for the coloration of organic derivatives of cellulose, wool and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo dye compounds of our invention can be prepared by diazotizing diazotizable members selected from the group consisting of an arylamine of the benzene series, an aminonaphthalene, an aminobenzothiazole and an aminobenzoxazole and coupling the diazonium compounds obtained with a benzene or naphthalene nucleus containing a

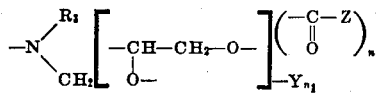

grouping wherein Z, Y, $R_3$, $n$ and $n_1$ have the meaning previously assigned to them, said benzene or naphthalene nucleus containing no substituent which would prevent coupling and being adapted to couple in para position to the grouping just described.

It will be understood that the term "a furyl group," as used herein and in the claims, includes furyl radicals such as furfuryl, tetrahydrofurfuryl, 5-ethylfurfuryl and 5-β-hydroxytetrahydrofurfuryl. Similarly, the term "alkenyl" refers to a univalent hydrocarbon radical containing a double bond. Illustrative cycloalkyl radicals include cyclobutyl, cyclohexyl and cycloheptyl. It will also be understood that the terms "a phenyl radical" and "a naphthyl radical" include not only the unsubstituted phenyl and naphthyl radicals but also such radicals substituted with substituents such as a hydroxy group, an alkoxy group, a halogen atom such as chlorine or bromine, and an alkyl group such as methyl, ethyl, propyl or butyl.

The nuclei represented by R, $R_1$ and $R_2$ can be substituted, for example, with substituent groups customarily appearing on such nuclei. As is understood in the art, these nuclei can be substituted with substituents such as a nitro group, a halogen atom, an alkyl group, an alkoxy group, a hydroxy group, a cyano group, a sulfonic acid group, a carboxylic acid group and an acyl group. The substituents named are intended to be illustrative and not limitative of those that may be present on the nuclei in question.

The following examples illustrate the preparation of the azo dye compounds of our invention:

*Example 1*

13.8 grams of p-nitroaniline are added to 200 cc. of water to which has been added 40 cc. of 36% hydrochloric acid. The resulting mixture is cooled to a temperature approximating 0–5° C. and the p-nitroaniline is diazotized while maintaining this temperature by adding, with stirring, 6.9 grams of sodium nitrite dissolved in water.

20.9 grams of glycerylaniline acetate are dissolved in water containing 11 cc. of 36% hydrochloric acid and the resulting solution is cooled to a temperature of 0–10° C. The diazonium solution prepared above is then added slowly with stirring, while maintaining the reaction mixture in a cooled condition. Concurrently with the addition of the diazonium solution, an aqueous solution of sodium acetate is added at a rate sufficient to maintain the reaction mixture just acid to Congo red paper. After complete addition of the diazonium solution, the reaction mixture is permitted to stand for a short time following which sufficient sodium acetate is added to make it neutral to Congo red paper. Upon completion of the coupling reaction which takes place, the desired dye compound formed is recovered by filtration, washed with water and dried. The dye compound obtained colors cellulose acetate silk, wool and silk orange-red.

23.7 grams of ethylglycerylaniline acetate can be substituted for the coupling component of the example to obtain a dye compound which similarly yields an orange-red shade on the materials named.

In place of the monoacetate grouping of the above coupling components, there may be used the propionate, butyrate, laurate, oleate, methoxyacetate, benzoate, naphthenate and tetrahydrofuroate groupings. The compounds obtained using the groupings named similarly color cellulose acetate silk, wool and silk orange-red.

*Example 2*

17.3 grams of 1-amino-2-chloro-4-nitrobenzene are diazotized and the diazonium compound obtained is coupled with 22.3 grams of glycerylaniline propionate. Coupling and recovery of the dye compound formed can be carried out as described in Example 1. The dye compound obtained colors cellulose acetate silk, wool and silk red. It will be understood that the propionate grouping present in the coupling component can be replaced, for example, with an acetate, a butyrate, a valerate, a laurate, an oleate, a benzoate, a naphthenate, or a tetrahydrofuroate grouping to obtain dye compounds which similarly color the materials just named red.

By the substitution of 23.7 grams of glyceryl m-toluidine propionate for the coupling component of the example, a dye compound is obtained which colors cellulose acetate silk, wool and silk red.

*Example 3*

21.7 grams of 1-amino-2-bromo-4-nitrobenzene are diazotized and the diazonium compound obtained is coupled with 33 grams of glyceryl-2-methoxy-5-chloroaniline benzoate. Coupling and recovery of the dye compound can be carried out in accordance with the general procedure described in Example 1. The dye compound obtained colors cellulose acetate silk, wool and silk red.

*Example 4*

13.5 grams of p-aminoacetophenone are diazotized and the diazonium compound obtained is coupled with 27.5 grams of glyceryl m-toluidine furoate. The dye compound obtained colors cellulose acetate silk, wool and silk orange.

*Example 5*

33 grams of p-nitrobenzeneazoglyceryl-m-toluidine are dissolved in ethyl acetate and 10.2 grams of acetic anhydride are added dropwise with stirring while maintaining a temperature of 50° C. Upon completion of the reaction which takes place, the reaction mixture is concentrated and the p-nitrobenzeneazo glyceryl-m-toluidine monoacetate is recovered by filtration, washed with water and dried. The dye compound obtained colors cellulose acetate silk, wool and silk rubine.

*Example 6*

17.3 grams of 1-amino-2-chloro-4-nitrobenzene are diazotized and the diazonium compound obtained is coupled with 27.5 grams of glyceryl-α-naphthylamine acetate. The dye compound obtained colors cellulose acetate silk, wool and silk violet.

28.7 grams of ethylglyceryl-α-naphthylamine acetate can be substituted for the coupling component of the example to obtain a dye compound which similarly colors the materials named violet.

*Example 7*

37 grams of 6-methoxybenzothiazole azoglyceryl-m-toluidine are dissolved in ethyl acetate or acetic acid and treated at 40–60° C. with 21 grams of acetic anhydride which is added dropwise with stirring. After reaction is complete, the reaction mixture is concentrated under reduced pressure. The dye compound formed, 6-methoxybenzothiazole azoglyceryl-m-toluidine diacetate is recovered by filtration, washed with water and dried. It colors cellulose acetate silk, wool and silk red.

*Example 8*

45 grams of

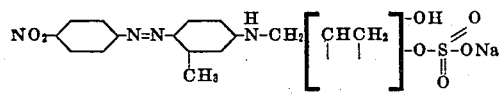

are dissolved in acetic acid and reacted with the anhydride of an acid such as acetic, butyric, palmitic, benzoic or naphthenic acid. By this reaction, the hydroxyl group of the glyceryl radical is converted to its acetate, butyrate, palmitate, benzoate or naphthenate form. The dye compounds obtained by the reactions indicated color cellulose acetate silk, wool and silk red. It will be understood that the sulfato group may be replaced by a phosphato or a sulfonic acid group, for example.

*Example 9*

21.7 grams of 1-amino-2-bromo-4-nitrobenzene are diazotized and the diazonium compound obtained is coupled with 28.3 grams of β-hydroxyethylglycerylaniline diacetate. Coupling and recovery of the dye compound formed can be carried out in accordance with the procedure described in Example 1. The dye compound obtained colors cellulose acetate silk, wool and silk rubine.

*Example 10*

15.6 grams of 1-amino-2-fluoro-4-nitrobenzene are diazotized and the diazonium compound obtained is coupled with 29.9 grams of glyceryl diphenylamine propionate. The dye compound obtained colors cellulose acetate silk, wool and silk red.

*Example 11*

22.8 grams of 1-amino-2,4-dinitro-6-chlorobenzene are diazotized and the diazonium compound obtained is coupled with 29.1 grams of glycerylallylaniline diacetate. The dye compound obtained colors cellulose acetate silk, wool and silk violet.

*Example 12*

25.6 grams of p-nitrobenzeneazo-m-toluidine are diazotized and the diazonium compound obtained is coupled with 26.5 grams of methylglycerylaniline diacetate. The dye compound obtained colors cellulose acetate silk, wool and silk red.

*Example 13*

18.6 grams of 5-nitro-2-aminobenzenesulfonic acid are diazotized in known fashion and the diazonium compound obtained is coupled with 43.4 grams of cetylglycerylaniline acetate. The dye compound obtained colors wool and silk red.

*Example 14*

43 grams of o-chloro-p-nitrobenzeneazoethylglyceryl cresidine are dissolved in acetic acid and the resulting solution is warmed to a temperature of 50° C. 10.5 grams of acetic anhydride dissolved in an acetic acid solution is then added dropwise with stirring. Stirring is continued for several hours following which the reaction mixture is permitted to cool, poured into water and the desired dye compound formed recovered by filtration, washed with water and dried. By the reaction described, a hydroxyl group of the glyceryl radical is converted to its acetate form. The dye compound thus prepared colors cellulose acetate silk a deep rubine shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated hereinbefore.

| Amine | Coupling component | Color |
|---|---|---|
| o-(F, Cl, Br, I)-aniline | (1) Glyceryl-m-chloroaniline acetate | Yellow. |
| Do | (2) Glycerylaniline butyrate propionate | Do. |
| Do | (3) Glycerylaniline acetate furoate | Do. |
| Do | (4) Glyceryl m-toluidine diacetate | Do. |
| Do | (5) Glyceryl m-toluidine benzoate | Do. |
| Do | (6) Glyceryl m-toluidine butyrate phosphate | Do. |
| Do | (7) Glyceryl 2-alkoxy-5-haloaniline methoxy acetate | Do. |
| Do | (8) Glyceryl 2-alkoxy-5-haloaniline naphthenate | Do. |
| Do | (9) Glyceryl cresidine dipropionate | Do. |
| Do | (10) Glyceryl cresidine acetate propionate | Do. |
| Do | (11) Glyceryl cresidine acetate iso butyrate | Do. |
| Do | (12) Glyceryl cresidine acetate formate | Do. |
| Do | (13) Glyceryl-2,5-dialkoxy aniline acetate succinate | Do. |
| Do | (14) Glyceryl-2,5-dialkoxy aniline acetate cyclohexate | Do. |
| Do | (15) Glyceryl-2,5-dialkoxy aniline stearate | Do. |
| Do | (16) Glyceryl-2,5-dialkoxy aniline stearate sulfate | Do. |
| Do | (17) Ethylglycerylaniline dipropionate | Do. |
| Do | (18) Methyl glyceryl aniline acid phthalate | Do. |
| Do | (19) Benzyl glyceryl aniline di-(acid maleate) | Do. |
| Do | (20) Phenyl glyceryl aniline acid malonate | Do. |
| Do | (21) Allyl glyceryl aniline acetate | Do. |
| Do | (22) Cyclohexyl glyceryl aniline acetate | Do. |
| Do | (23) β-Hydroxyethyl glyceryl aniline triacetate | Do. |
| Do | (24) β-Hydroxyethyl glyceryl aniline diacetate propionate | Do. |
| Do | (25) Propyl glyceryl-m-anisidine acid succinate | Do. |
| Do | (26) Butyl glyceryl cresidine stearate | Do. |
| 1-amino-2,4-dichlorobenzene | Coupling components 1-26 | Orange-yellow. |
| 1-amino-2-bromo-4-methylbenzene | do | Yellow. |
| 1-amino-2-nitro-4-methoxybenzene | do | Yellowish-orange to orange-red. |

| Amine | Coupling component | Color |
|---|---|---|
| 1-amino-3-nitro-5-ethoxybenzene | Coupling components 1-26 | Orange. |
| p-Nitroaniline | ----do---- | Orange-red to rubine. |
| 1-amino-2-chloro-4-nitrobenzene | ----do---- | Red to rubine. |
| 1-amino-2,4-dinitro-6-(F, Cl, Br, I)-benzene | ----do---- | Rubine to red-blue. |
| 1-amino-2,4-dinitro-naphthalene | ----do---- | Do. |
| 6-methoxy-2-aminobenzothiazole | ----do---- | Red to violet. |
| 6-methoxy-2-aminobenzoxazole | ----do---- | Do. |
| p-Nitrobenzeneazo aniline | ----do---- | Red to rubine. |
| p-Aminobenzene sulfonamide | ----do---- | Yellowish-orange to orange. |
| 2-amino-5-nitrophenyl methyl sulfone | ----do---- | Red to violet. |
| 1-amino-2-hydroxy-4-nitrobenzene | ----do---- | Orange-red to rubine. |
| 1-amino-2,4-dinitrobenzene | (27) Glyceryl α-naphthylamine acetate propionate | Violet to purple. |
| Do | (28) Glyceryl α-naphthylamine acetate butyrate | Do. |
| Do | (29) 2-methyl glyceryl α-naphthylamine acetate acid phthalate | Do. |
| Do | (30) Ethylglyceryl-α-naphthylamine dipropionate | Do. |
| Do | (31) Ethylglyceryl-α-naphthylamine naphthenate | Do. |
| Do | (32) Ethylglyceryl-α-naphthylamine benzoate | Do. |
| Do | (33) Propylglyceryl-α-naphthylamine acid succinate | Do. |
| Do | (34) β-hydroxyethylglyceryl-α-naphthylamine triacetate | Do. |
| Do | (35) 2-methyl-β-hydroxypropylglyceryl-α-naphthylamine diacetate | Do. |
| Do | (36) 2-methoxy-crotonylglyceryl-α-naphthylamine diacetate | Do. |
| Do | (37) 5-chloro-butylglyceryl-α-naphthylamine cyclohexate | Do. |
| 1-amino-2,4-dinitro-6-(F, Cl, Br, I)-benzene | Coupling components 27-37 | Violet to blue and blue-green. |
| 6-methoxy-2-aminobenzothiazole | ----do---- | Red to rubine. |
| 6-methoxy-2-aminobenzoxazole | ----do---- | Do. |
| α-Naphthylamine | ----do---- | Do. |

While our invention has been described more particularly in connection with unsulfonated compounds, it will be understood that sulfonated compounds are included within the scope of our invention. Sulfonated aromatic amines that can be diazotized and the diazonium compounds resulting coupled with the coupling components of our invention to give dye compounds which color wool and silk include, for example, p-sulfanilic acid, 1-amino-4-sulfonic naphthalene, 2-naphthylamine - 8 - sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene. To illustrate, p-sulfanilic acid can be diazotized and the diazonium compound obtained coupled with glyceryl-m-chloroaniline diacetate, glycerylcresidine acetate propionate, and ethyl glyceryl α-naphthylamine dipropionate to obtain dye compounds which color wool and silk red to blue.

The alkoxy group referred to in coupling components Nos. 7, 8, 13, 14, 15, and 16 can be, for example, methoxy, ethoxy, or propoxy. Similarly the halogen atom referred to in coupling components Nos. 7 and 8 can be, for example, bromine and chlorine. As is apparent from Example 8 and the tabulation, a hydroxy group of the glyceryl radical can be replaced by a sulphato, a phosphato, or a sulfonic acid group, for example.

The manner of introducing the acyl ester group or groups into the compounds of our invention is illustrated in Examples 7, 8, and 14. The reactions there described, although described in connection with azo dyes, are applicable for the introdutcion of one or more acyl ester groups into a benzene or naphthalene coupling component containing a glycerylamino grouping. One or more acyl ester groups can be present in the compounds of our invention. Where more than one acyl ester group is present the acyl ester groups may be the same or different. Thus, glyceryl β-hydroxyethylaniline can be treated to first introduce an acetate group, further treated to introduce another acyl ester group such as a propionate group, and still further treated to introduce a third acyl ester group such as the benzoate group. As the acylation reaction can be carried out in known manner and the acyl agents employed are known, it is not believed necessary to further discuss the manner of introducing acyl ester groups into the compounds of our invention.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivative of cellulose textile materials from an aqueous solution of the dye which may contain salt. For a more complete description as to how the azo dye compounds of our invention may be employed, in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

$$R-N=N-R_2$$

wherein R represents the residue of a member selected from the group consisting of an aryl nucleus of the benzene series, an aryl nucleus of the naphthalene series, a benzoxazole nucleus and a benzothiazole nucleus, $R_2$ represents the residue of a naphthalene nucleus containing a

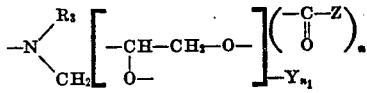

grouping, wherein Z represents a member selected from the group consisting of hydrogen, an alkyl, a cycloalkyl, an alkenyl, a carboxyalkenyl, a phenyl, a naphthyl and a furyl group, Y represents a member selected form the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

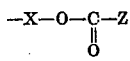

group, wherein X stands for an alkyl hydrocarbon radical, $n$ stands for 1 or 2 and $n_1$ stands for 0 or 1, in para position to the azo bond.

2. The azo dye compounds having the general formula:

wherein R represents the residue of an aryl nucleus of the benzene series, $R_2$ represents the residue of a naphthalene nucleus containing a

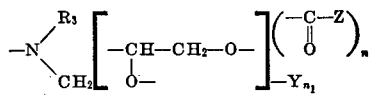

grouping, wherein Z represents a member selected from the group consisting of hydrogen, an alkyl, a cycloalkyl, an alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

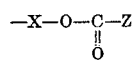

group, wherein X stands for an alkyl hydrocarbon radical, $n$ stands for 1 or 2 and $n_1$ stands for 0 or 1, in para position to the azo bond.

3. The azo dye compound having the formula:

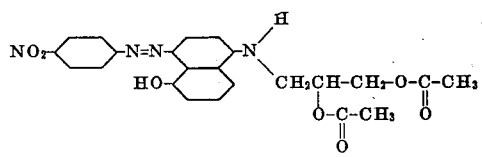

4. Textile material colored with an azo dye compound having the general formula:

wherein R represents the residue of a member selected from the group consisting of an aryl nucleus of the benzene series, an aryl nucleus of the naphthalene series, a benzoxazole nucleus and a benzothiazole nucleus, $R_2$ represents the residue of a naphthalene nucleus containing a

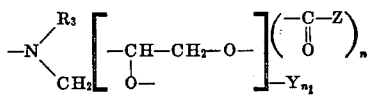

grouping, wherein Z represents a member selected from the group consisting of hydrogen, an alkyl, a cycloalkyl, an alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

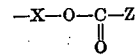

group, wherein X stands for an alkyl hydrocarbon radical, $n$ stands for 1 or 2 and $n_1$ stands for 0 or 1, in para position to the azo bond.

5. Textile material colored with an azo dye compound having the general formula:

wherein R represents the residue of an aryl nucleus of the benzene series, $R_2$ represents the residue of a naphthalene nucleus containing a

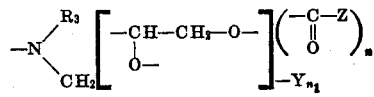

grouping, wherein Z represents a member selected from the group consisting of hydrogen, an alkyl, a cycloalkyl, an alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

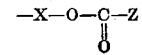

group, wherein X stands for an alkyl hydrocarbon radical, $n$ stands for 1 or 2 and $n_1$ stands for 0 or 1, in para position to the azo bond.

6. A cellulose acetate colored with a nuclear non-sulfonated azo dye compound having the general formula:

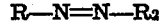

wherein R represents the residue of a member selected from the group consisting of an aryl nucleus of the benzene series, an aryl nucleus of the naphthalene series, a benzoxazole nucleus and a benzothiazole nucleus, $R_2$ represents the residue of a naphthalene nucleus containing a

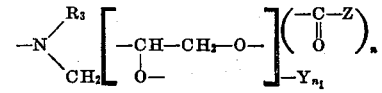

grouping, wherein Z represents a member selected from the group consisting of hydrogen, an alkyl, a cycloalkyl, an alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

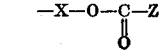

group, wherein X stands for an alkyl hydrocarbon radical, $n$ stands for 1 or 2 and $n_1$ stands for 0 or 1, in para position to the azo bond.

7. A cellulose acetate colored with a nuclear non-sulfonated azo dye compound having the general formula:

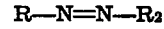

wherein R represents the residue of an aryl nucleus of the benzene series, $R_2$ represents the residue of a naphthalene nucleus containing a

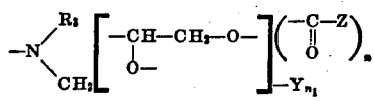

grouping, wherein Z represents a member selected from the group consisting of hydrogen, an alkyl, a cycloalkyl, an alkenyl, a carboxyalkenyl, a phenyl, a naphthyl and a furyl group, Y represents a member selected from the group consisting of hydrogen, an alkyl, a furyl, a phenyl, a naphthyl and an alkenyl group, $R_3$ represents a member selected from the group consisting of hydrogen, an aliphatic, a cycloalkyl, a phenyl, a naphthyl and a

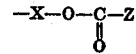

group, wherein X stands for an alkyl hydrocarbon radical, $n$ stands for 1 or 2 and $n_1$ stands for 0 or 1, in para position to the azo bond.

JOSEPH B. DICKEY.
JAMES G. McNALLY.